Patented Aug. 21, 1923.

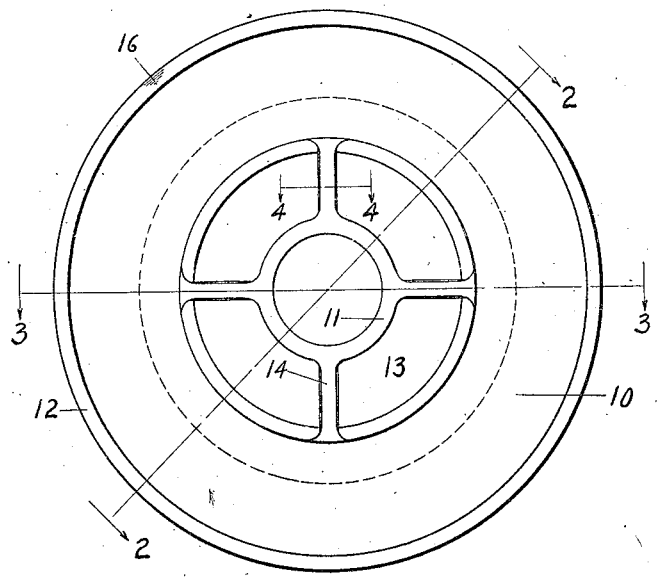
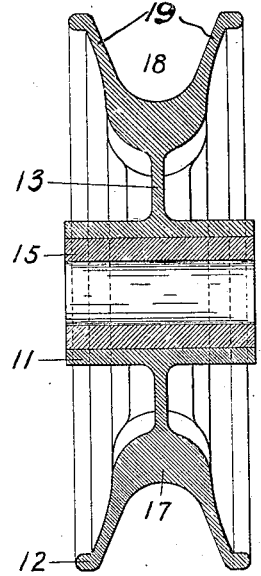
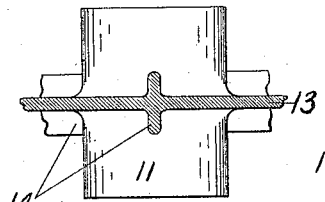
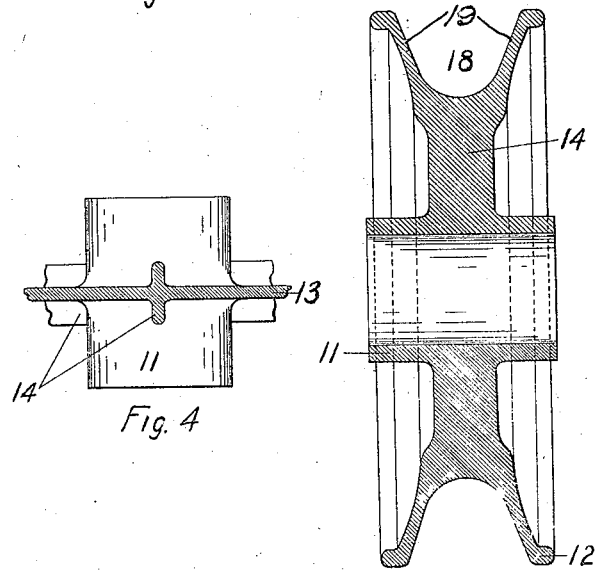

1,465,873

UNITED STATES PATENT OFFICE.

FRED C. SCHOENTHAL, OF ALDEN, NEW YORK.

TROLLEY WHEEL.

Application filed March 30, 1922. Serial No. 548,226.

*To all whom it may concern:*

Be it known that I, FRED C. SCHOENTHAL, a citizen of the United States, residing at Alden, in the county of Erie and State of New York, have invented certain new and useful Improvements in Trolley Wheels, of which the following is a specification.

This invention relates to an improvement in trolley wheels and more particularly to an integral cast trolley wheel of aluminum bronze which by reason of its composition and construction combines strength with lightness to a degree not previously attainable.

The trolley wheels used prior to this invention may be divided into two general groups. First cast wheels made of bronze or brass and by reason of their composition both expensive and heavy, so much so that the amount of material used and consequently the weight of the wheel is reduced by using spokes to connect the rim to the hub. Second, assembled wheels having the hub and rim of bronze connected by very thin spokes or a very thin web (which connecting means function solely to transmit the current) and cheek plates, usually steel stampings, which are mounted on the hub and engage and support the rim at each side. It is practically impossible to make such wheels, which constitute an attempt to reduce the expense by eliminating all the bronze or brass possible and substituting therefor steel, absolutely uniformly and evenly balanced, a very desirable and essential feature in a trolley wheel.

The chief objects of this invention are the production of a trolley wheel, which is a unitary casting of aluminum bronze; is cheap not only because of the material used but also because of the manufacturing processes employed which are facilitated by the construction of the wheel and in which very little machining is required; is light and yet, by reason of its great tensile strength, can be used in place of the other types of wheels mentioned.

More particularly a further object of this invention is the production of a cast trolley wheel in which the rim is joined to the hub by a continuous imperforate web having on each face a series of integral radial ribs forming spokes, all parts of said wheel being integral.

Other objects will appear from an examination of the specification and of the accompanying drawing forming a part thereof and in which Figure 1 is a side elevation of a trolley wheel embodying this invention;

Figures 2 and 3 are transverse sections of said wheel taken along the lines 2—2 and 3—3 of Figure 1; and Figure 4 is a detailed section taken along the line 4—4 of Figure 1.

Referring to the drawings the reference numeral 10 is used to designate a trolley wheel cast from aluminum bronze, which consists of a hub 11 and a rim 12 connected by spokes 14. The rim 12 has a base 17 and side flanges 19, said base and flanges providing a peripheral groove 18. The base 17 is thickened as compared with the flanges 19, that is to say its thickness is approximately three times the thickness of said flanges. The rim 12 and spokes 14 are formed integrally with a circumferentially continuous web 13 which is located in the central plane of the wheel and extends inwardly from said rim, the spokes projecting in the manner of ribs from the opposite faces of said web. The hub 11 is provided in the usual manner with a suitable bushing 15. Referring paricularly to Figures 2 and 3 it will be noted that the web 13 is relatively thin as compared with the width of the base 17 and that the spokes 14 of each pair at opposite faces of said web are together substantially of the same width as the base of the groove 18 of the rim 12 so that as the groove deepens by wear the wire will bear against the ends of the spokes which, with the periphery of the web 13, provide an even track for the wire. If the spokes were omitted it is obvious that the web periphery would not be of the width necessary to hold the wire since, if the groove were worn down to any such degree, the sides of the groove would be cut off. This is prevented by the presence of the spokes which have a firm connection with the sides of the groove as well as with the bottom so that the wire is held in place. If, however, the spokes 14 alone were used when the degree of wear above referred to is reached the spokes would have a tendency to catch in the trolley wire particularly at the switches and crossings and tear it down.

Moreover in casting the wheel the molten aluminum bronze is poured into the die at a point on the rim edge, indicated for purposes of illustration as 16, and reaches the hub 11 through both the spokes and the web, particularly the former. The width of the web is varied somewhat in order to control the density of the metal at the thickened base 17 of the groove 18 where the greatest wear takes place, thus overcoming any tendency toward porosity of the wheel at that most important location.

After the casting has been made the hole through the hub 11 must be reamed out to receive the bushing 15 and the groove 18 in the rim 12 machined off in a lathe to provide an absolutely even surface. The jaws of the lathe engage each side of the web 13 between the spokes 14 so that the spokes act as drivers to rotate the wheel during the machining operation. Except for these spokes the holding and turning of the wheel would be far more difficult and would in most circumstances necessitate its mutilation or disfigurement in one way or another.

The manufacture of a trolley wheel of aluminum bronze in so far as applicant can determine is absolutely new and novel. Such a wheel is not only, as pointed out above, cheaper, lighter and stronger than the types of trolley wheels formerly known, but it is more economical because it can be melted down and used again for a similar purpose, in fact its scrap value has been determined to be as high as 90%.

Having thus described my invention that which I claim as new and for which I desire the protection of Letters Patent of the United States is the following:

1. A cast trolley wheel consisting of a hub, a rim surrounding said hub and having a base and side flanges which provide a peripheral groove, said base being relatively thick as compared with said flanges, radial spokes connecting said rim and hub, and a circumferentially continuous web formed integral with said spokes and rim and projecting inward from said rim, said web being located in the central plane of the wheel and being relatively thin as compared with the base of the rim, and the spokes projecting in the manner of ribs from the opposite faces of said web and having a combined width substantially the same as the width of the base of said peripheral groove.

2. A trolley wheel cast of aluminum bronze consisting of a hub, a rim surrounding said hub and having a base and side flanges which provide a peripheral groove, said base being relatively thick as compared with said flanges, radial spokes connecting said rim and hub, and a circumferentially continuous web formed integral with said spokes and rim and projecting inward from said rim, said web being located in the central plane of the wheel and being relatively thin as compared with the base of the rim, and the spokes projecting in the manner of ribs from the opposite faces of said web and having a combined width substantially the same as the width of the base of said peripheral groove.

In testimony whereof I affix my signature.

FRED C. SCHOENTHAL.